United States Patent [19]

Cole, Jr.

[11] 4,354,740
[45] Oct. 19, 1982

[54] SURFACE ALIGNMENT PROCESS FOR LIQUID CRYSTAL DISPLAYS

[75] Inventor: Herbert S. Cole, Jr., Scotia, N.Y.

[73] Assignee: General Electric Company, Schenectady, N.Y.

[21] Appl. No.: 152,741

[22] Filed: May 23, 1980

[51] Int. Cl.$^3$ .............................................. G02F 1/13
[52] U.S. Cl. ............................ 350/340; 23/230 LC; 350/343
[58] Field of Search ............... 350/340, 343; 427/162, 427/167; 137/205; 252/351, 408 LC; 23/230 LC; 428/1

[56] References Cited

U.S. PATENT DOCUMENTS

| | | | |
|---|---|---|---|
| 3,904,797 | 9/1975 | Jones, Jr. et al. | 350/340 X |
| 3,941,901 | 3/1976 | Harsch | 427/108 |
| 3,973,057 | 8/1976 | Channin et al. | 350/340 X |
| 4,070,749 | 1/1978 | Misono et al. | 350/343 X |
| 4,165,922 | 8/1979 | Morrissy | 350/340 X |

OTHER PUBLICATIONS

*IBM Technical Disclosure Bulletin*, vol. 16, No. 2, Jul. 1973, p. 395, Edmonds, H. D. et al., "Liquid Crystal Cell Filling".

Primary Examiner—John K. Corbin
Assistant Examiner—Daniel Julian Hubbard
Attorney, Agent, or Firm—Geoffrey H. Krauss; James C. Davis, Jr.; Marvin Snyder

[57] ABSTRACT

Homeotropic surface alignment is provided in liquid crystal display cells, utilizing high temperature peripheral sealing material, by fabricating the empty cell prior to introducing a solution of a homeotropic-aligning surfactant dissolved in a volatile solvent. The solvent is evaporated to provide a surfactant film on the cell cavity interior surfaces. The cell is then filled with the liquid crystal material and the cell is sealed.

22 Claims, 3 Drawing Figures

U.S. Patent
Oct. 19, 1982
4,354,740
FIG. 1
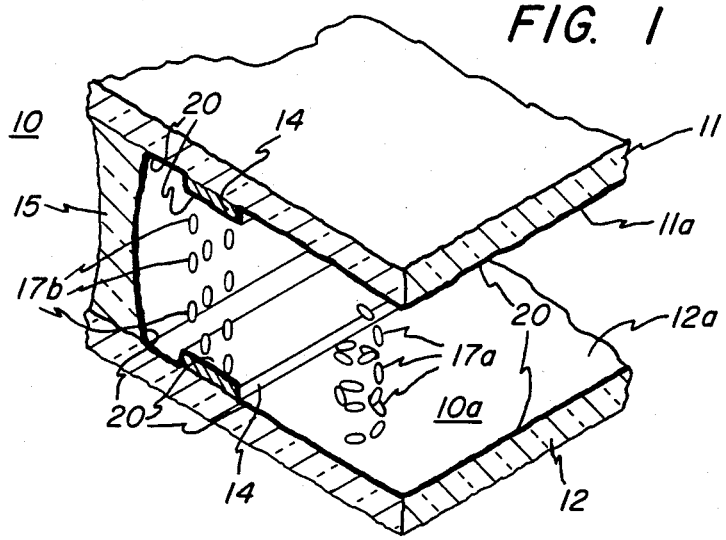
FIG. 2
```
FABRICATE CELL WITH HI-TEMP
PERIPHERAL SEAL MATERIAL
            │
FILL WITH COUPLING
AGENT SOLUTION
            │
EVAPORATE SOLVENT TO LEAVE
COUPLING AGENT ON CELL SURFACES
            │
FILL CELL WITH LIQUID
CRYSTAL MATERIAL
            │
SEAL FILLED CELL
```
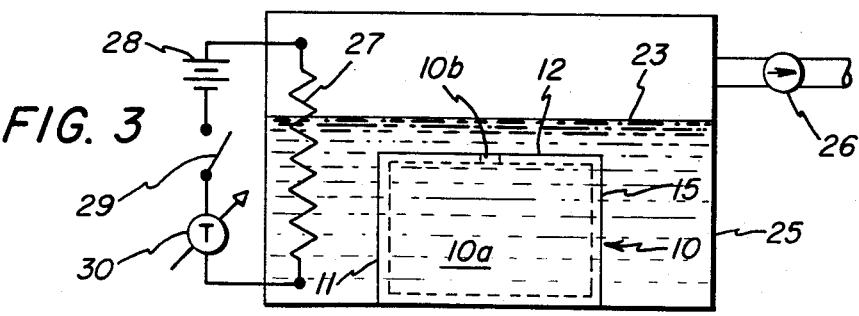
FIG. 3

SURFACE ALIGNMENT PROCESS FOR LIQUID CRYSTAL DISPLAYS

BACKGROUND OF THE INVENTION

The present invention concerns liquid crystal display cells and, more particularly, a novel process for providing homeotropic surface alignment in liquid crystal display cells.

In many forms of liquid crystal display cells, it is desirable to provide homeotropic surface alignment at the boundaries between the liquid crystal material and the electrodes and surfaces of the cell-defining substrates. For example, in a reflective dichroic liquid crystal display utilizing the cholesteric-nematic transition, it is known that providing a homeotropic surface alignment results in a display cell which not only has a relatively low threshold voltage for the desired display material transition, but which also provides a more uniform appearance to the observer in the quiescent state, with substantially no adverse effects due to the absorption of stray polarized light by the cell. In this type of cell, the "focal conic texture", which is present immediately after a display segment has been deactivated, is provided with an absorbance more nearly approaching the absorbance due to the homeotropic quiescent state, resulting in a display of improved overall appearance.

It is equally as well known that the homeotropic boundary condition can be achieved by absorption of a surfactant on the interior surfaces of the display device cavity, or by the addition of surfactants to the liquid crystal material, such that, when the cell is filled, the "polar" surfactant molecules absorb on the surface of the cell interior walls to achieve the desired homeotropic boundary condition. However, the use of additives in the liquid crystal material tends to increase the conductivity of the material, and hence increases the current and power required for switching the optical states of the device. In some applications, use of certain surfactants, such as silane coupling agents, may be acceptable. However, in certain applications a display cell having a high degree of hermeticity is required, which high degree of hermeticity can only be achieved by use of a glass frit peripheral seal. Providing such a seal requires that the glass frit seal material be brought to a temperature of between about 500° C. and about 550° C., which is well above the temperature, on the order of 250° C., at which available surfactants decompose. It was hitherto impossible to reproducibly achieve a homeotropic alignment in cells which must use glass frit seals for achieving a high degree of hermeticity. A process by which homeotropic alignment can be achieved in liquid crystal display cells having glass frit seals, and further capable of large scale production, is therefore highly desirable.

BRIEF SUMMARY OF THE INVENTION

In accordance with the invention, homeotropic alignment is provided at the boundary between a liquid crystal material and the electrodes and interior surfaces of cell substrates, by fabricating an empty display cell, using a high temperature peripheral sealing material as required, prior to filling the cell cavity with a solution of the desired surfactant dissolved in a volatile carrier solvent. The filled cell is then subjected to conditions such that the volatile carrier solvent evaporates, and deposits the surfactant on the interior cell cavity surfaces. The display cell, now having the cavity surfaces thereof bearing the desired homeotropic alignment film, is subsequently filled with the liquid crystal material and sealed.

In one presently preferred embodiment, the surfactant solution contains up to about 1 percent, by volume, of a silane coupling agent, dissolved in distilled water. The empty cell cavity is vacuum filled with the silane coupling agent-distilled water solution and is then vacuum baked, at a preselected temperature less than the decomposition temperature of the surfactant, to remove the volatile carrying solvent and leave a film of homeotropic alignment material upon the cell cavity interior surfaces.

Accordingly, it is an object of the present invention to provide a novel process for providing a homeotropic surface alignment film upon the interior surfaces of a liquid crystal display cell cavity.

This and other objects of the present invention will become apparent upon consideration of the following detailed description, when read in conjunction with the drawings.

BRIEF DESCRIPTION OF THE DRAWINGS

FIG. 1 is a prospective view of a portion of a liquid crystal display cell, and useful in understanding principles of the present invention;

FIG. 2 is a flow diagram illustrating the steps of the novel process of the present invention; and FIG. 3 is a schematic representation of a vacuum oven apparatus useful in carrying out the process of the present invention.

DETAILED DESCRIPTION OF THE INVENTION

Referring initially to FIG. 1, a portion of a liquid crystal display cell 10 includes first and second substrates 11 and 12, at least one of which substrates is fabricated of an optically transparent material. Electrodes 14 are fabricated, by known techniques, upon the interior surfaces 11a and 12a of the substrates, prior to placing substrates surfaces 11a and 12a in facing relationship, with electrodes 14 in registration. As is well-known in the art, electrodes 14 may be fabricated of substantially transparent and conductive material. A seal member 15 is fabricated between the peripheries of the aligned and spaced-apart substrates 11 and 12 to form a completely enclosed central cell cavity 10a which is filled with a liquid crystal material 17. Illustratively, liquid crystal material 17 is one that utilizes the guest-host cholesteric-nematic transition as the operative display effect, wherein a suitable dichroic dye is added to the host liquid crystal to allow for light absorption. Thus, the elongated liquid crystal molecules 17a, in the cell-deactivated state, have their directors (elongated axes) disposed along a helical path whereby light is absorbed during passage through the cell. By coupling a potential source, having a magnitude greater than the cell threshold voltage, between a pair of registered electrodes 14 disposed upon the interior surfaces 11a and 12a, the helical arrangement of guest dye and host liquid crystal molecules is unwound and the molecules are aligned homeotropically, i.e., the molecular directors are substantially perpendicular to the surfaces of the electrodes and substrates. This state is quite compatible with the molecules near the surfactant surfaces.

The surfactant forming homeotropic-boundary-condition-inducing layers 20 may be provided by substances such as: a silane coupling agent, such as is available as XZ-2300 from Dow Corning; an organometallic (chrome) complex (in isopropyl alcohol), such as is available as Quilon C from DuPont Chemicals; a polyamide, such as is available as Versamid 100 from General Mills Chemicals, and the like commercially available surfactants. However, the surfactants decompose at temperatures above about 250° C., whereby the homeotropic alignment ability of the surfactant is destroyed in cells fabricated by techniques heretofore available, wherein the surfactants are absorbed upon the substrate interior surfaces prior to the formation of peripheral sealing member 15. Destruction of the homeotropic alignment film is particularly to be found in those liquid crystal display cells wherein seal member 15 is formed of a glass frit material, requiring firing of the substrate-glass frit assembly to frit-glazing temperatures on the order of about 500° C.

Referring now to all of the figures, my novel process for providing a surface alignment film in liquid crystal display cell 10, commences by fabricating electrodes 14 to their desired patterns upon substrate surfaces 11a and 12a. The electrode-bearing substrates are then positioned with the electrode-bearing surfaces facing one another and in registration. The peripheral seal member 15 is fabricated, to provide a cell having a central cavity 10a, with a seal possessing a high degree of hermeticity. Thus, the first step in my cell fabricating process is to provide the empty cell having an empty central cavity 10a, communicating with the cell exterior by means of a fill hole 10b (see FIG. 3). The cell cavity 10a is filled with a surfactant solution. For example, a surfactant solution 23 was provided by dissolving up to 1 percent, by volume, of the Dow Corning XZ-2300 silane coupling agent in distilled water; a quantity sufficient to fill cavity 10a was introduced therein. This may be accomplished by placing the cell 10 in a vacuum chamber 25, which is filled to a sufficient depth with the surfactant solution 23, whereby cell 10 is completely submerged within the solution. Vacuum chamber 25 is evacuated and is then returned to ambient atmospheric pressure, whereby solution 23 fills cell central cavity 10a. The remaining surfactant solution 23 is then drained from the chamber.

The solvent is evaporated to leave the surfactant film 20 upon the electrode and interior cell cavity surfaces. This may be accomplished by sealing chamber 25, whereupon a heater element 27, which may be a resistance element provided with operating power from a potential source 28, is activated, as by closure of switch 29 and setting of associated temperature control 30 to the desired temperature, e.g., about 80° C., and the chamber evacuated. Cell 10 remains in the vacuum oven for about 1 hour, at 80° C., during which time interval the solvent, e.g., distilled water, is evaporated and the film 20 of the surfactant, e.g., the silane coupling agent, is deposited upon the interior-facing surfaces of electrodes 14 and the interior substrate surfaces 11a and 12a. It should be understood that the step of evaporating the solvent to leave a surfactant film on the cell interior surfaces may be done by merely raising the temperature of the solution-containing cell 10, although baking the cell under vacuum tends to increase the speed of evaporation and therefore decrease the time necessary to bake out the volatile solvent.

After providing the surfactant film, the cell is filled with the desired liquid crystal material and the fill hole is sealed, with both steps being carried out by known techniques. It should be understood that this technique is useable for display cells filled with any liquid crystal material, and not just the aforementioned exemplary liquid crystal materials utilizing a cholesteric-nematic transition for providing the optically effect thereof. I have also found that production of homeotropic alignment boundary conditions by this novel method tend to produce display cells having very uniform alignment and threshold voltage characteristic conditions, and which cells do not show any of the dark striations and blotches, indicative of poor alignment, when the cells are examined in polarized light.

While the present invention has been set forth with reference to presently preferred embodiments thereof, many modifications and variation will now occur to those skilled in the art. It is my intent, therefore, to be limited only by the scope of the appending claims and not by the particularity of details presented herein.

What is claimed is:

1. A method for providing, in one display condition, homeotropic alignment to liquid crystal material filling a display cell, comprising the steps of:
    (a) providing an empty cell having a fill hole communicating to an empty cavity therein;
    (b) dissolving a surfactant, selected to provide homeotropic alignment, in a volatile carrier solvent;
    (c) filling the cell cavity with the solution;
    (d) evaporating the volatile carrier solvent to deposit the surfactant on the interior cell cavity surfaces;
    (e) filling the cell cavity with the liquid crystal material, said liquid crystal material being essentially devoid of any surfactants; and
    (f) sealing the fill hole.

2. The method of claim 1, wherein step (b) includes the step of dissolving up to about 1 percent, by volume, of surfactant in the solvent.

3. The method of claim 1, wherein the solvent of step (b) is distilled water.

4. The method of claim 1, wherein step (a) includes the steps of providing a pair of spaced-apart substrates having the edges thereof in registration; and sealing the periphery of the registered substrates with a material requiring a sealing temperature greater than the temperature at which decomposition of the surfactant occurs.

5. The method of claim 4, wherein the sealing material is a glass frit.

6. The method of claim 4, further including the step of depositing electrodes upon the interior-facing surfaces of the substrates prior to sealing the periphery thereof.

7. The method of claim 1, wherein the liquid crystal material is a cholesteric-nematic liquid crystal material.

8. A method for providing, in one display condition, homeotropic alignment to liquid crystal material filling a display cell, comprising the steps of:
    (a) providing an empty cell having a fill hole communicating to an empty cavity therein;
    (b) dissolving a surfactant, selected to provide homeotropic alignment, in a volatile carrier solvent;
    (c) filling the cell cavity with the solution by: immersing the cell in the solution; placing the cell under a vacuum; and then returning the cell to ambient atmospheric pressure to fill the cell cavity with the solution;

(d) evaporating the volatile carrier solvent to deposit the surfactant on the interior cell cavity surfaces;

(e) filling the cell cavity with the liquid crystal material; and (f) sealing the fill hole.

9. The method of claim 8, wherein step (b) includes the step of dissolving up to 1 percent, by volume, of surfactant in the solution.

10. The method of claim 8, wherein the solvent of step (b) is distilled water.

11. The method of claim 8, wherein step (a) includes the steps of providing a pair of spaced-apart substrates having the edges thereof in registration; and sealing the periphery of the registered substrates with a material requiring a sealing temperature greater than the temperature at which decomposition of the surfactant occurs.

12. The method of claim 11, wherein the sealing material is a glass frit.

13. The method of claim 11, further including the step of depositing electrodes upon the interior-facing surfaces of the substrates prior to sealing the periphery thereof.

14. The method of claim 8, wherein the liquid crystal material is a cholesteric-nematic liquid crystal material.

15. A method for providing, in one display condition, homeotropic alignment to liquid crystal material filling a display cell, comprising the steps of:

(a) providing an empty cell having a fill hole communicating to an empty cavity therein;

(b) dissolving a surfactant, selected to provide homeotropic alignment, in a volatile carrier solvent;

(c) filling the cell cavity with the solution;

(d) evaporating the volatile carrier solution by: placing the cell under vacuum; heating the cell to a preselected temperature while under vacuum; and maintaining the cell under vacuum and at the preselected temperature for a time interval selected to evaporate the solvent and leave the homeotropic alignment surfactant deposited as a film upon the interior surfaces of said cell cavity;

(e) filling the cell cavity with the liquid crystal material; and (f) sealing the fill hole.

16. The method of claim 15, wherein the heating step is carried out at a preselected temperature about 80° C.

17. The method of claim 15, wherein step (b) includes the step of dissolving up to about 1 percent, by volume, of surfactant in the solvent.

18. The method of claim 15, wherein the solvent of step (b) is distilled water.

19. The method of claim 15, wherein step (a) includes the steps of providing a pair of spaced-apart substrates having the edges thereof in registration; and sealing the periphery of the registered substrates with a material requiring a sealing temperature greater than the temperature at which decomposition of the surfactant occurs.

20. The method of claim 15, wherein the sealing material is a glass frit.

21. The method of claim 15, further including the step of depositing electrodes upon the interior-facing surfaces of the substrates prior to sealing the periphery thereof.

22. The method of claim 15, wherein the liquid crystal material is a cholesteric-nematic liquid crystal material.

* * * * *